United States Patent [19]

Yonemitsu et al.

[11] 3,887,647

[45] June 3, 1975

[54] THERMOPLASTIC BLENDED RESINOUS COMPOSITION CONTAINING POLYPHENYLENE ETHER

[75] Inventors: Eiichi Yonemitsu, Kashiwa; Akitoshi Sugio; Seiichi Kamiyama; Masanobu Masu; Masaharu Kimura, all of Tokyo, Japan

[73] Assignee: Mitsubishi Gas Chemical Company, Inc., Tokyo, Japan

[22] Filed: Oct. 2, 1973

[21] Appl. No.: 402,820

[30] Foreign Application Priority Data

Oct. 4, 1972  Japan.................................. 47-98982

[52] U.S. Cl......... 260/876 B; 260/45.75; 260/45.95; 260/873; 260/874; 260/876 R
[51] Int. Cl.......................... C08f 15/00; C08f 19/00
[58] Field of Search .......... 260/876 R, 876 B; 41/77

[56] References Cited
UNITED STATES PATENTS

| | | | |
|---|---|---|---|
| 3,285,997 | 11/1966 | Rubens ............................ | 260/880 R |
| 3,383,435 | 5/1968 | Cizek ................................ | 260/893 |
| 3,639,506 | 2/1972 | Haaf................................. | 260/876 R |
| 3,639,508 | 2/1972 | Kambour ......................... | 260/876 R |
| 3,644,227 | 2/1972 | Factor.............................. | 260/2.3 |
| 3,660,531 | 5/1972 | Lauchlan.......................... | 260/876 B |
| 3,663,654 | 5/1972 | Haaf................................. | 260/876 R |
| 3,663,661 | 5/1972 | Katchman ....................... | 260/876 B |
| 3,761,541 | 9/1973 | Katchman ....................... | 260/876 R |
| 3,787,532 | 1/1974 | Carmelite........................ | 260/876 R |
| 3,792,122 | 2/1974 | Fromuth ......................... | 260/876 R |
| 3,792,123 | 2/1974 | Abolins............................ | 260/876 R |

*Primary Examiner*—Paul Lieberman
*Attorney, Agent, or Firm*—Wenderoth, Lind & Ponack

[57] ABSTRACT

A thermoplastic blended resinous composition having very superior moldability and workability, comprising 10 to 40 percent by weight of a polyphenylene ether, 10 to 30 percent by weight of high styrene rubber and 50 to 75 percent by weight of a rubbermodified chlorostyrene polymer, the total sum of the proportions of these constituents being 100 percent by weight.

6 Claims, No Drawings

THERMOPLASTIC BLENDED RESINOUS COMPOSITION CONTAINING POLYPHENYLENE ETHER

This invention relates to a thermoplastic blended resinous composition for a molding material having superior physical properties, especially impact strength, non-inflammability and heat resistance and also good moldability and workability. More specifically, this invention relates to a molding resinous composition having the above properties which comprises a blend of a polyphenylene ether, a rubber-modified polychlorostyrene and high styrene rubber.

The polyphenylene ether is known to be a thermoplastic resin having superior mechanical properties such as tensile strength, electrical properties such as volume inherent resistivity, dielectric constant or dielectric strength, and a high heat distortion temperature. But poor moldability and workability and low resistance to oxidation with heat have been considered as its defects.

With a view to remedying these defects, it was proposed to mix polystyrene with the polyphenylene ether (see U.S. Pat. Nos. 3,384,682 and 3,383,435). In these resinous compositions improvement of the moldability and workability of the polyphenylene ether is noted. Furthermore, in order to utilize the superior characteristics of the polyphenylene ether, resin compositions comprising a blend of it with a polysulfone, polyamide or polycarbonate have also been proposed. These resin compositions result in the imparting of other superior physical properties to the polyphenylene ether rather than the improvement of its moldability. Thus, in spite of the proposal of the various resin compositions intended for the modification of polyphenylene ethers, resin compositions having good moldability and workability and well balanced properties as a molding material have not necessarily been available. Such a blended resin composition now in commercial use is a combination of a polyphenylene ether and polystyrene. Generally, high impact polystyrene is used as the polystyrene in such a composition. This resin composition exhibits fairly well improved impact strength and moldability and workability. However, where a higher level of impact strength is required, the blending of high impact polystyrene does not bring about a satisfactory result.

Japanese Laid-Open Patent Publication No. 5,085/71 and Dutch Laid-Open Patent No. 7,105,528 disclose that a high level of impact strength is attained by dispersing a rubber component consisting of particles having a maximum average diameter of about 2 $\mu$ in a continuous phase of a matrix consisting of a polyphenylene ether and polystyrene. However, it is virtually difficult to obtain a rubber-modified polyphenylene ether having such a property by mixing of resin components with each other. Other methods have been proposed for obtaining a polyphenylene ether-containing resin composition in which a rubbery component is homogeneously dispersed, but none of them are commercially advantageous.

Accordingly, it is an object of this invention to provide a thermoplastic blended resinous composition containing a polyphenylene ether, which has very superior moldability and workability and retains the high heat distortion temperature possessed by the polyphenylene ether resin to an extent suitable for practical uses.

Another object of this invention is to provide a thermoplastic blended resinous composition containing a polyphenylene ether, which has improved impact strength and is flame retardant.

Still another object of this invention is to provide a thermoplastic blended resinous composition containing a polyphenylene ether having superior impact strength and a high rubber content by mixing resin components with each other.

The above objects of this invention are achieved by a thermoplastic blended resinous composition comprising a. 10 to 40% by weight of a polyphenylene ether having recurring units of the formula

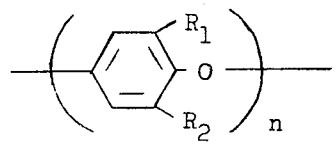

wherein $R_1$ and $R_2$ are the same or different, and each represents a methyl or ethyl group, and $n$ is the degree of polymerization, b. 10 to 30 percent by weight of high styrene rubber composed of units derived from styrene and units derived from a conjugated diene compound, wherein the content of the units derived from styrene is 40 to 60 percent by weight, and c. 50 to 75 percent by weight of a rubber-modified chlorostyrene polymer composed of units derived from a conjugated diene compound and units derived from chlorostyrene, wherein the content of the units derived from the conjugated diene compound is 2 to 15 percent by weight, the total of the proportions of components (a), (b) and (c) being 100 percent by weight.

Our copending application Ser. No. 301,729 discloses a three-component resin composition comprising a blend in a specific ratio of polyphenylene ether, high styrene rubber and a rubber-modified polychlorostyrene, which composition has various superior properties, especially high heat distortion temperature and superior impact resistance and fatigue resistance and also satisfactory non-inflammability corresponding to SE-1 of UL Bulletin — Subject 94. Further investigations led to the discovery that when a polyphenylene ether, high styrene rubber and a rubber-modified polychlorostyrene are mixed in a specific ratio outside the range disclosed in our copending application, the resulting resin composition has superior impact strength and non-inflammability and especially superior moldability and workability while retaining the high heat distortion temperature possessed by the polyphenylene ether to an extent suitable for practical uses. It is surprising that in spite of the fact that the blend ratio which is disclosed in the copending application as giving the excellent properties is changed drastically, the properties of the resulting composition of this invention are well balanced, and these properties are very advantageous for commercial applications.

The polyphenylene ether used in this invention is a polymer having recurring units of the following formula

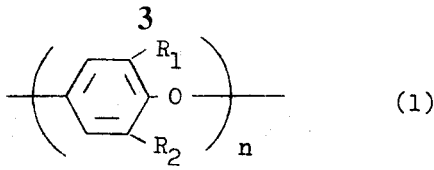

(1)

wherein $R_1$ and $R_2$ are the same or different, and each represents a methyl or ethyl group, and $n$ is a positive integer of at least 85, and represents the degree of polymerization.

Typical examples of the polyphenylene ether are poly (2,6-dimethyl-1,4-phenylene ether), poly (2-methyl-6-ethyl-1,4-phenylene ether), and poly (2,6-diethyl-1,4-phenylene ether). These polyphenylene ethers are polymers obtainable, for example, by the methods disclosed in U.S. Pat. Nos. 3,306,874; 3,306,875; 3,257,357 and 3,257,358.

The high styrene rubber means a rubbery polymer composed of 40 to 60 percent by weight of units derived from monomeric styrene and units derived form a conjugated diene compound. Examples of the rubbery component introduced by the conjugated diene compound are polymers composed of structural units derived from butadiene, isoprene, chloroprene, etc., or copolymers containing the structural units derived from such a conjugated diene compound. The high styrene rubber can be obtained, for example, by mechanically mixing a rubbery component such as polybutadiene with polystyrene, or by subjecting a styrene monomer to bulk polymerization in the presence of the rubbery component, or to solution polymerization using a solvent.

Furthermore, copolymers of a styrene monomer and conjugated diene monomers or a monomeric mixture containing conjugated diene compounds can also be used. In order for the resulting resin composition of this invention to exhibit characteristic properties, the use of, as the high styrene rubber component, a polymer obtained by polymerizing styrene in the presence of a rubbery component or a copolymer obtained by polymerizing a monomeric mixture of a conjugated diene compound and styrene is especially suitable.

The high styrene rubber so obtained is a rubbery substance containing 40 to 60 percent by weight of the rubbery component, which cannot be used itself as a molding material and should be distinguished from a styrene-butadiene rubber (SBR). On the other hand, high impact polystyrene used for the modification of the conventional polyphenylene ethers only contains not more than 10 percent by weight of the rubbery component. Accordingly, the high styrene rubber of this invention differs from the high impact polystyrene mentioned above.

The rubber-modified polychlorostyrene, which is a third component of the resin composition of this invention, is a polychlorostyrene resin containing as a rubbery component 2 to 15 percent by weight of a polymer containing recurring units derived from a conjugated diene compound such as butadiene, isoprene or chloroprene, and is considered to be a high impact polychlorostyrene. The rubber-modified polychlorostyrene denotes a resin composition obtained by mechanically mixing a rubber component such as polybutadiene with a polymer of a chlorostyrene monomer expressed by the general formula

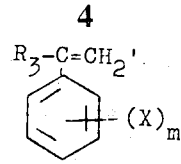

wherein
$R_3$ is a hydrogen atom or a lower alkyl group, X is a chlorine atom, and $m$ is an integer of 1 or 2, or by polymerizing the chlorostyrene monomer in the presence of the rubber component by bulk polymerization emulsion polymerization, solution polymerization, suspension polymerization or a combination of these methods. Further, the foregoing rubber component also comprehends the rubbery material containing the copolymeric units serived from the conjugated diene compounds and the vinyl monomers.

The chlorostyrene monomer used to introduce chlorostyrene units into the rubber-modified polychlorostyrene may contain up to 75 percent by weight, preferably not more than 50 percent by weight, of another styrene monomer such as styrene, α-methyl styrene or vinyl toluene.

In order for the resulting resin composition of this invention to exhibit its characteristic properties, the use of a resin obtained by polymerizing the chlorostyrene monomer or a monomeric mixture of it with another vinyl monomer in the presence of the rubber component is suitable.

The inclusion of the structural units serived from chlorostyrene in the resin composition of this invention has the advantage that the addition of only a small amount of a flame retardant is sufficient for attaining a high level of flame retardance corresponding to SE-0 stipulated in UL Bulletin — Subject 94, and the defect of deterioration in properties by the addition of a large quantity of a flame retardant can be completely avoided, and that it has a higher heat distortion temperature than compositions containing units derived from styrene have.

The proportions of the components in the resin composition of this invention are determined according to compatibility of the resin components with each other and in relation to the properties of the resin composition. The resin composition of this invention can be used itself as a molding material suitable for injection molding, or compression molding, etc. If desired, a versatile thermoplastic resin such as polycarbonate, polyethylene terephthalate or an aromatic polyamide may be added to the resin composition in an amount not exceeding 4 percent by weight. The addition of such a resin does not impair the properties of the resin composition of this invention.

As previously stated, the resin composition of this invention per se exhibits superior flame retardance corresponding to SE-1 of UL Bulletin — Subject 94 standards. By adding not more than 10 percent by weight, preferably 7 to 0.5 percent by weight, based on the resin composition, of a flame retardant, the resin composition exhibit excellent flame retardance corresponding to SE-0 of UL Bulletin — Subject 94 standards. The flame retardant may be an aromatic bromine compound such as decabromobiphenyl, pentabromophenol, pentabromotoluene, hexabromobenzene, decabromodiphenyl carbonate, or tetrabromophthalic anhydride. The addition of such a flame retardant to the resin composition of this invention does not result in the impairment of its properties. Since feasible resin compositions having flame retardance corresponding to SE-0 of UL Bulletin — Subject 94 standards have not yet been known, the flame retardance of the resin composition of this invention is of utmost significance.

If desired, various conventional additives, for example, a stabilizer such as an alkylphenol compound, mercaptan compound, organic disulfide compound or phosphite, an organic or inorganic pigment, a flame retardant other than those mentioned above such as a phosphoric ester, a halogenated compound, or a mixture of the phosphoric ester or halogenated compound with an antimony compound, a plasticizer such as a phosphate or phthalate compound, an ultraviolet absorbent, a lubricant, or a filler may be added to the resin composition.

As fully described hereinabove, the present invention concerns a new resinous composition consisting of the three components of the polyphenylene ether, high styrene rubber and the rubber-modified chlorostyrene polymer, and having various superior physical properties, especially impact strength, and thermal stability as well as outstanding non-inflammability. In mixing these three components, the procedures available include any of those of mixing and kneading the powders and/or pellets of these components using, for example, an extruder, a roller or other blenders.

The following Examples are given to illustrate the features of the composition of this invention. The parts and percentages in the Examples are on a weight basis unless otherwise specified. The physical properties were measured by the following test methods.

Heat distortion temperature

The measurement was made in accordance with ASTM D 648.

Tensile Strength

The measurement was made in accordance with ASTM D 638–68 using Autograph IS-5000 manufactured by Shimazu Seisakusho, Japan.

Elongation

The measurement was made in accordance with ASTM D 638–68.

Impact Strength

The measurement was made in accordance with ASTM D 286 by the notched Izod method.

EXAMPLE 1

20 Parts of polyphenylene ether produced by using a copper-amine complex as a catalyst and having an inherent viscosity $[\eta]$, measured on a chloroform solution at 25°C., of 0.49 dl/g, 60 parts of a rubber modified polychlorostyrene [a 75/25 (mol ratio) graft copolymer of chlorostyrene/styrene containing 6 percent of polybutadiene, which was obtained by polymerizing in bulk a monomeric mixture of chlorostyrene and styrene in the presence of polybutadiene; a reducing viscosity, as measured on the 0.3 percent concentration of the resin phase in methyl ethyl ketone at 30°C., being 0.36 dl/g], and 20 parts of high styrene rubber (a block copolymer of styrene/butadiene in a ratio of 60/40 having a melt flow value of $10.1 \times 10^{-3}$ cc/sec., the melt flow value being measured at 200°C. under a load of 30 kg using a Koka-type flow tester with a nozzle of 1 × 2$^L$) were mixed. The mixture was further mixed in a blender with 2 parts of titanium oxide, 0.5 part of 2-mercaptobenzothiazole zinc salt, 0.5 part of 2,6-di-5,-butyl-4-methyl phenol, 0.5 part of wax (K·3 wax manufactured by Kawaken Fine Chemicals, Co., Ltd.), 5 parts of decabromobiphenyl and 2 parts of antimony oxide. The mixture was pelletized by a biaxial extruder, and then molded by an injection molding machine (Meiki Seisakusho SJ–35B) to form molded articles. The injection was very easy, and the molded articles had the properties as shown in Table 1.

EXAMPLE 2

The procedure of Example 1 was repeated except that 30 parts of the polyphenylene ether, 60 parts of the rubber-modified polychlorostyrene and 10 parts of high styrene rubber were used. The results are shown in Table 1.

EXAMPLE 3

The procedure of Example 1 was repeated except that 20 parts of the polyphenylene ether, 70 parts of the rubber-modified polychlorostyrene and 10 parts of the high styrene rubber were used. The results are shown in Table 1.

COMPARATIVE EXAMPLE 1

The moldability of NORYL SE-100 (tradename of the product of General Electric Company) and Kaneace MUH (tradename for the product manufactured by Kanegafuchi Chemical Co., Ltd.) which are commercially available modified polyphenylene ether resins, and the physical properties of the molded articles were measured. The injection molding machine was the same as that used in Example 1. The results are also shown in Table 1.

Table 1

| | Example 1 | Example 2 | Example 3 | Noryl SE-100 | Kaneace MUH |
|---|---|---|---|---|---|
| Injection temperature (°C.) | | | | | |
| Nozzle | 230 | 230 | 230 | 230 | 230 |
| Front portion | 240 | 240 | 240 | 240 | 240 |
| Intermediate-Rear | 230–220 | 230–220 | 230–220 | 240–220 | 230–220 |
| Rotating speed of screw (r.p.m.) | 55–60 | 55–60 | 55–60 | 40–65 | 40–60 |
| Injection pressure (kg/cm$^2$) | 850–990 | 850–1000 | 850–990 | 800–1300 | 800–1300 |
| Mold temperature (°C.) | 75 | 75 | 75 | 60–70 | 60–70 |
| Melting initiation temperature (°C.) on Koka-type flow tester (60 kg load) | 173 | 183 | 173 | 170 | 190 |
| Minimum injection ressure (injection temperature 240°C) [kg/cm$^2$] | 830 | 1180 | 830 | 1050 | — |
| Combustibility (UL-94 1/16" thick) | SE-0 | SE-0 | SE-0 | SE-1 | Burned |
| Heat distortion temperature (after annealing, °C) | 117.7 | 126.9 | 117.7 | 112.5 | 120 |
| Tensile strength (kg/cm$^2$) | 402 | 578 | 432 | 496 | 439 |
| Elongation (%) | 24 | 17 | 19 | 27 | 13 |
| Break-strength (kg/cm$^2$) | 684 | 915 | 776 | 872 | — |
| Elasticity (kg/cm$^2$) | $25.8 \times 10^3$ | $29 \times 10^3$ | $28.6 \times 10^3$ | $25.3 \times 10^3$ | — |
| Izod impact strength | | | | | |

Table 1 — Continued

|  | Example 1 | Example 2 | Example 3 | Noryl SE-100 | Kaneace MUH |
|---|---|---|---|---|---|
| (notched, kg.cm/cm) | | | | | |
| ⅛ inch thick | 16.4 | 13.8 | 10.5 | 6.0 | 9.3 |
| ¼ inch thick | 14.7 | 11.8 | 8.5 | 4.7 | 8.0 |
| Tensil impact | 95 | 75 | 85 | 90 | — |

EXAMPLES 4 and 5

Molding materials were produced using the same resin components as used in Example 1 and various additives shown in Table 2. The molding materials obtained had very good moldability, and the molded articles had excellent properties as shown below in Table 2.

Table 2

|  | Example 4 | Example 5 |
|---|---|---|
| Polyphenylene ether (same as in Example 1) | 20 parts | 30 parts |
| Rubber-modified polychlorostyrene (same as in Example 1) | 60 | 60 |
| High styrene rubber (same as in Example 1) | 20 | 10 |
| Titanium oxide | 2 | 2 |
| 2-Mercaptobenzothiazole zinc salt | 0.5 | 0.5 |
| 2,6-di-t.-butyl-4-methyl phenol | 0.5 | 0.5 |
| K.3 wax | 0.5 | 0.5 |
| Decabromo biphenyl | 4 | 4 |
| Moldability | | |
| Molding temperature (°C.) | 240 | 240 |
| Minimum injection pressure (kg/cm$^2$) | 840 | 1180 |
| Melting initiation temperature on a Koka-type flow tester (°C.) | 175 | 184 |
| Combustibility (UL-94, 1/16 inch thick) | SE-1 | SE-1 |
| Heat distortion temperature (18.6 kg/cm$^2$ load, after annealing, °C.) | 120.3 | 130.3 |
| Tensile strength (kg/cm$^2$) | 420 | 600 |
| Elongation (%) | 24 | 20 |
| Break strength (kg/cm$^2$) | 695 | 930 |
| Elasticity (kg/cm$^2$) | 26.0 × 10$^3$ | 29.5 × 10$^3$ |
| Izod impact strength (notched, Kg.cm/cm) | | |
| ⅛ inch thick | 26.2 | 21.2 |
| ¼ inch thick | 22.1 | 18.0 |

EXAMPLE 6

30 Parts of the same polyphenylene ether as used in Example 1, 60 parts of the same rubber-modified polychlorostyrene as in Example 1, and 10 parts of an elastomer having a high styrene content and comprising polyisoprene and polystyrene (the ratio of polystyrene/polyisoprene being 60/40; having a melt flow value of 12.0 × 10$^{-3}$ cc/sec., the melt flow value being measured at 200°C. under a load of 30 kg using a Koka-type flow tester with a nozzle of 1 × 2$^L$) were mixed with the same amounts of the same additives as used in Example 1. The moldability of the molding material and the properties of the molded articles are shown in Table 3.

EXAMPLE 7

20 Parts of polyphenylene ether having an inherent viscosity [η], as measured on a chloroform solution at 25°C., of 0.44 dl/g, 60 parts of a rubber-modified polychlorostyrene containing 7 percent by weight of polybutadiene (a graft copolymer obtained by bulk-polymerizing a monomeric mixture of chlorostyrene/styrene in a mold ratio of 75/25 in the presence of polybutadiene; a reducing viscosity, as measured on a 0.3 percent concentration of the resin phase in methyl ethyl ketone at 30°C., being 0.37), and 20 parts of high styrene rubber [CALIFLEX TR-1101 (tradename for a styrene/butadiene block copolymer manufactured by Shell Chemicals Ltd.) is mixed with DIAFLEX HF-77 (tradename for GP polystyrene manufactured by Mitsubishi Monsanto Chemicals Co., Ltd.), and the weight ratio of styrene/butadiene is adjusted to 60/40 ] were mixed with the same amounts of the same additives as in Example 1. The moldability of the resulting molding material and the properties of the molded articles are shown in Table 3.

EXAMPLE 8

The procedure of Example 7 was repeated except that 25 parts of the polyphenylene ether, 60 parts of the rubber-modified polychlorostyrene and 15 parts of the high styrene rubber were used. The properties measured are shown in Table 3.

EXAMPLE 9

The procedure of Example 7 was repeated except that 15 parts of the polyphenylene ether, 75 parts of the rubber-modified polychlorostyrene, 10 parts of the high styrene rubber, and one part of antimony oxide were used. The moldability of the resulting molding material and the properties of the molded articles are shown in Table 3.

EXAMPLE 10

A molding material was prepared by mixing 20 parts of the same polyphenylene ether as in Example 1, 60 parts of a high impact type copolymer of chlorostyrene/α-methylstyrene (containing 30 percent of α-methyl styrene and 10 percent of rubber component, and prepared by polymerizing the monomeric mixture in bulk in the presence of polybutadiene, and then converting the polymerization system into suspension; a reducing viscosity, as measured on a 0.3 percent concentration of the resin phase in methyl ethyl ketone at 30°C., being 0.341 dl/g), 20 parts of the same high styrene rubber as used in Example 7, and the same amounts of the same additives as in Example 1. The moldability of this molding material and the properties of the molded articles are as shown in Table 3.

EXAMPLE 11

20 Parts of the same polyphenylene ether as used in Example 1, 60 parts of high impact polychlorostyrene (produced by emulsion polymerization and containing 7 percent of polybutadiene having a rubber particle size of 0.1 to 0.4 μ; a reducing viscosity of the resin phase, as measured on a 0.3 percent methyl ethyl ketone solution at 30°C. being 0.36 dl/g), 20 parts of the same high styrene rubber as used in Example 7, and the same amounts of the same additives as in Example 1 were mixed with each other to form a molding material. The moldability of the molding material and the properties of the molded articles are as shown in Table 3.

EXAMPLE 12

A molding material was prepared by mixing 20 parts of polyphenylene ether having an inherent viscosity [η], as measured on a chloroform solution at 25°C., of 0.5 dl/g, 50 parts of the same rubber-modified polychlorostyrene as used in Example 1, 30 parts of high styrene rubber obtained by mixing CALIFLEX TR-1101 used above (tradename of the product of Shell Chemicals Ltd.) with polychlorostyrene (a homopolymer, 0.35 dl/g of a reducing viscosity, as measured on a 0.3 percent methyl ethyl ketone solution at 30°C.) and the weight ratio of (styrene + chlorostyrene)/-butadiene is adjusted to 60/40), and the same amounts of the same additives as used in Example 1. The moldability of the resulting molding material and the properties of the molded articles are as shown in Table 3.

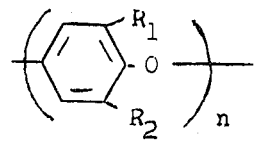

wherein $R_1$ and $R_2$ are the same or different, and each represents a methyl or ethyl group, and $n$ is a positive integer of at least 85 and represents the degree of polymerization, b. 10 to 30 percent by weight of a block copolymer of a conjugated diene compound and styrene composed of units derived from styrene and units derived from a conjugated diene compound, in which the content of the units derived from styrene is 40 to 60 percent by weight, and Table 3

|  | Example 6 | Example 7 | Example 8 | Example 9 | Example 10 | Example 11 | Example 12 |
|---|---|---|---|---|---|---|---|
| Moldability |  |  |  |  |  |  |  |
| Molding temp. (°C.) | 240 | 230 | 240 | 220 | 245 | 240 | 240 |
| Minimum injection pressure (kg/cm²) | 820 | — | — | — | — | 830 | 950 |
| Melting initiation temperature (°C.) | 173 | 168 | 170 | 165 | 175 | 174 | 178 |
| Combustibility (UL-94.1/16 inch thick) | SE-0 | SE-0 | SE-0 | SE-0 | SE-O | SE-O | SE-O |
| Heat distortion temperature (18.6 kg/cm² load, after annealing (°C.) | 117.3 | 115.3 | 123 | 112.3 | 125.3 | 120.0 | 123.5 |
| Tensile strength (kg/cm²) | 401 | 400 | 520 | 400 | 410 | 425 | 450 |
| Elongation (%) | 26 | 27 | 25 | 22 | 25 | 27 | 20 |
| Break strength (kg/cm²) | 681 | 675 | — | 765 | 690 | 690 | 695 |
| Elasticity (kg/cm²) | $25.5 \times 10^3$ | $25.4 \times 10^3$ | — | $27.5 \times 10^3$ | $26.0 \times 10^3$ | $27.5 \times 10^3$ | $28 \times 10^3$ |
| Izod impact strength (notched, kg.cm/cm) |  |  |  |  |  |  |  |
| ⅛ inch thick | 15.8 | 16.1 | 13.0 | 10.3 | 17.5 | 19.5 | 18.0 |
| ¼ inch thick | 13.1 | 14.5 | — | 8.4 | 13.7 | 17.5 | 17.0 |

EXAMPLE 13

30 Parts of polyphenylene ether having an inherent viscosity [η], as measured on a chloroform solution at 25°C., of 0.55 dl/g and produced by the oxidative polycondensation of 2,6-diethyl phenol using a copper-amine complex as a catalyst, 60 parts of a rubber-modified polychlorostyrene (a graft copolymer of chlorostyrene/styrene in a ratio of 75/25 containing 8 percent of polybutadiene; a reducing viscosity of the resin phase, as measured on a 0.3 percent methyl ethyl ketone solution at 30°C., being 0.355 dl/g), and 10 parts of the same high styrene rubber as used in Example 1 were mixed by a Henschel mixer, and further, 2 parts of titanium oxide, 3 parts of triphenyl phosphite, 0.5 part of 2,6-di-t.-butyl-4-methylphenol and 5 parts of triphenyl phosphate were further added. The resulting mixture was pelletized by being extruded by means of a biaxial extruder. The pellets were molded by an injection molding machine. The properties of the molded articles were as follows:

| Tensile strength | 550 kg/cm² |
|---|---|
| Elongation | 25% |
| Izod impact strength (notched, ⅛ inch thick) | 12.5 kg·cm/cm |
| Heat distortion temperature (18.6 kg/cm² load, after annealing) | 125°C. |

What is claimed is:

1. A thermoplastic blended resinous composition comprising a. 10 to 40 percent by weight of a polyphenylene ether having recurring units of the formula c. 50 to 75 percent by weight of a graft copolymer of chlorostyrene on a diene rubber substrate composed of units derived from a conjugated diene compound and units derived from chlorostyrene, in which the content of the units derived from the conjugated diene compound is 2 to 15 percent by weight, the total of the proportions of these components being 100 percent by weight.

2. The composition of claim 1 wherein said component (c) is a rubber-modified chlorostyrene polymer composed of units derived from a conjugated diene compound and units derived from a mixture of more than 50 percent by weight of chlorostyrene and the remainder being styrene or its derivative.

3. The composition of claim 1 which further contains a thermal stabilizer, a plasticizer and a flame retardant.

4. The composition of claim 1 which has non-inflammability corresponding to, or exceeding, the level of SE-1 in the combustion test in accordance with the UL-Subject-94 Standards.

5. The composition of claim 3 wherein said flame retardant is selected from the group consisting of decabromobiphenyl, pentabromophenol, pentabromotoluene, hexabromobenzene, decabromodiphenyl carbonate and tetrabromophthalic anhydride.

6. The composition of claim 5 which has non-inflammability corresponding to the level of SE-0 in the combustion test in accordance with the UL-Bulletin-Subject-94 Standards.

* * * * *

UNITED STATES PATENT OFFICE
CERTIFICATE OF CORRECTION

Patent No. 3,887,647          Dated      June 3, 1975

Inventor(s)    Eiichi Yonemitsu et al.

It is certified that error appears in the above-identified patent and that said Letters Patent are hereby corrected as shown below:

The term of this patent subsequent to

June 3, 1992, has been disclaimed.

$Signed$ and $Sealed$ this twenty-second Day of June 1976

[SEAL]

Attest:

RUTH C. MASON
*Attesting Officer*

C. MARSHALL DANN
*Commissioner of Patents and Trademarks*